United States Patent [19]

Reinwall, Jr.

[11] 3,897,161

[45] July 29, 1975

[54] ROPE LOCK DEVICE

[75] Inventor: Ernest William Reinwall, Jr., McHenry, Ill.

[73] Assignee: Illinois Tool Works Inc., Chicago, Ill.

[22] Filed: Jan. 16, 1974

[21] Appl. No.: 433,777

[52] U.S. Cl........... 403/211; 24/134 Q; 24/134 QA; 24/134 KD; 24/81 CC; 24/115 R
[51] Int. Cl.².................. F16G 11/04; F16G 11/10
[58] Field of Search.... 24/134 Q, 134 QA, 134 KD, 24/134 R, 134 N; 292/323; 403/211, 209

[56] References Cited
UNITED STATES PATENTS

| | | | |
|---|---|---|---|
| 432,539 | 7/1890 | Mains | 24/134 K |
| 432,756 | 7/1890 | Mains | 24/134 K |
| 1,257,040 | 2/1918 | Stevernagel | 24/134 Q |
| 3,437,981 | 4/1969 | Keller | 24/134 R |

*Primary Examiner*—Bernard A. Gelak
*Attorney, Agent, or Firm*—Olson, Trexler, Wolters, Bushnell & Fosse, Ltd.

[57] ABSTRACT

The embodiment of the invention disclosed herein is directed to a rope lock assembly having a body member wherein there is provided a plurality of movable arm means which have gripping end portions to engage a rope passing therethrough. The gripping end portions urge the rope against the interior side walls of the body for restraining the rope from movement in either direction therethrough. A release tab or lever extends from the body and is manually operated to remove the gripping means from engagement with the rope to allow the rope to be pulled in either direction through the body. Release of the manually operated release means will allow resilient biasing means within the rope lock assembly to urge the gripping members back into engagement with the rope to prevent movement of the rope in either direction.

19 Claims, 23 Drawing Figures

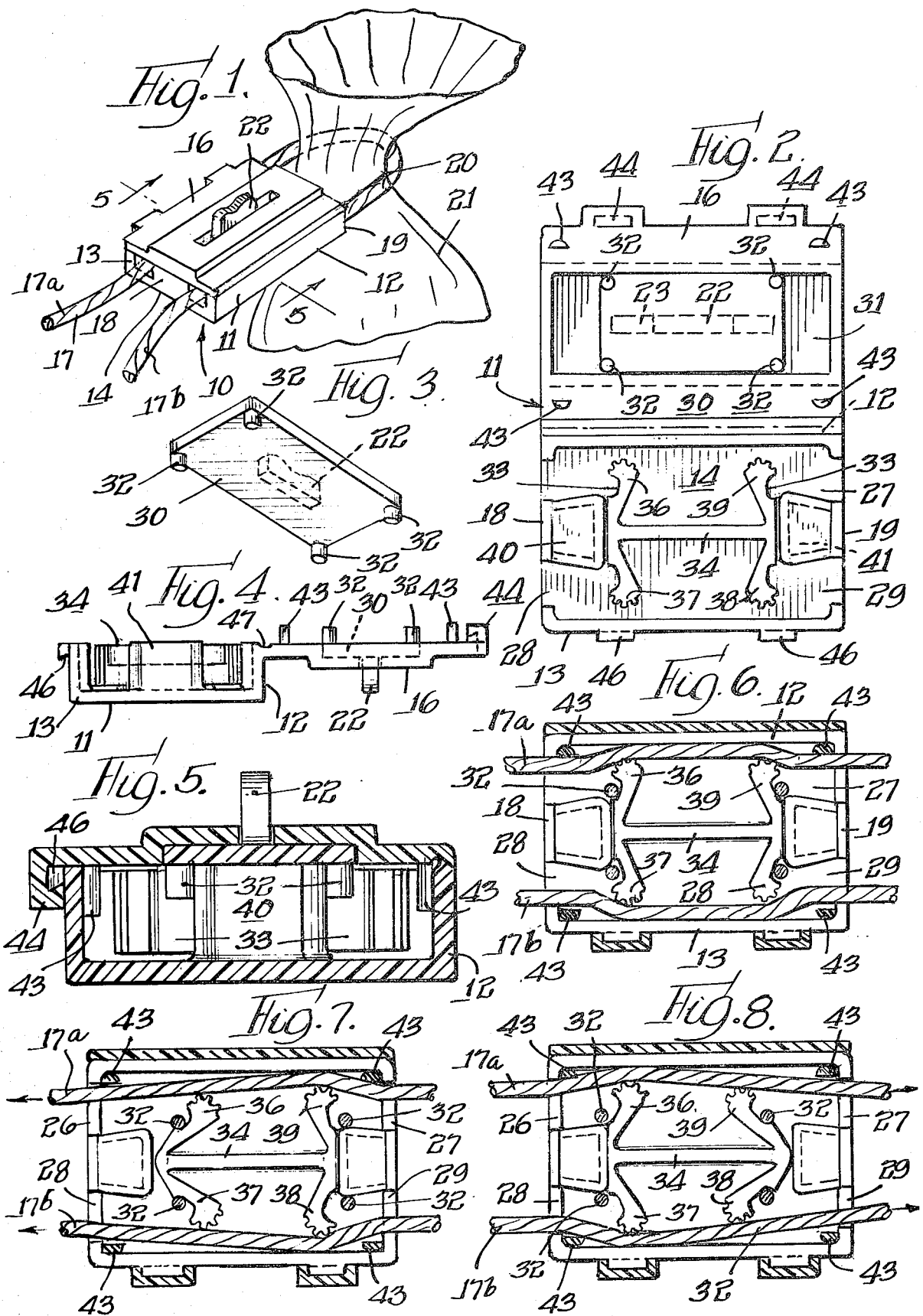

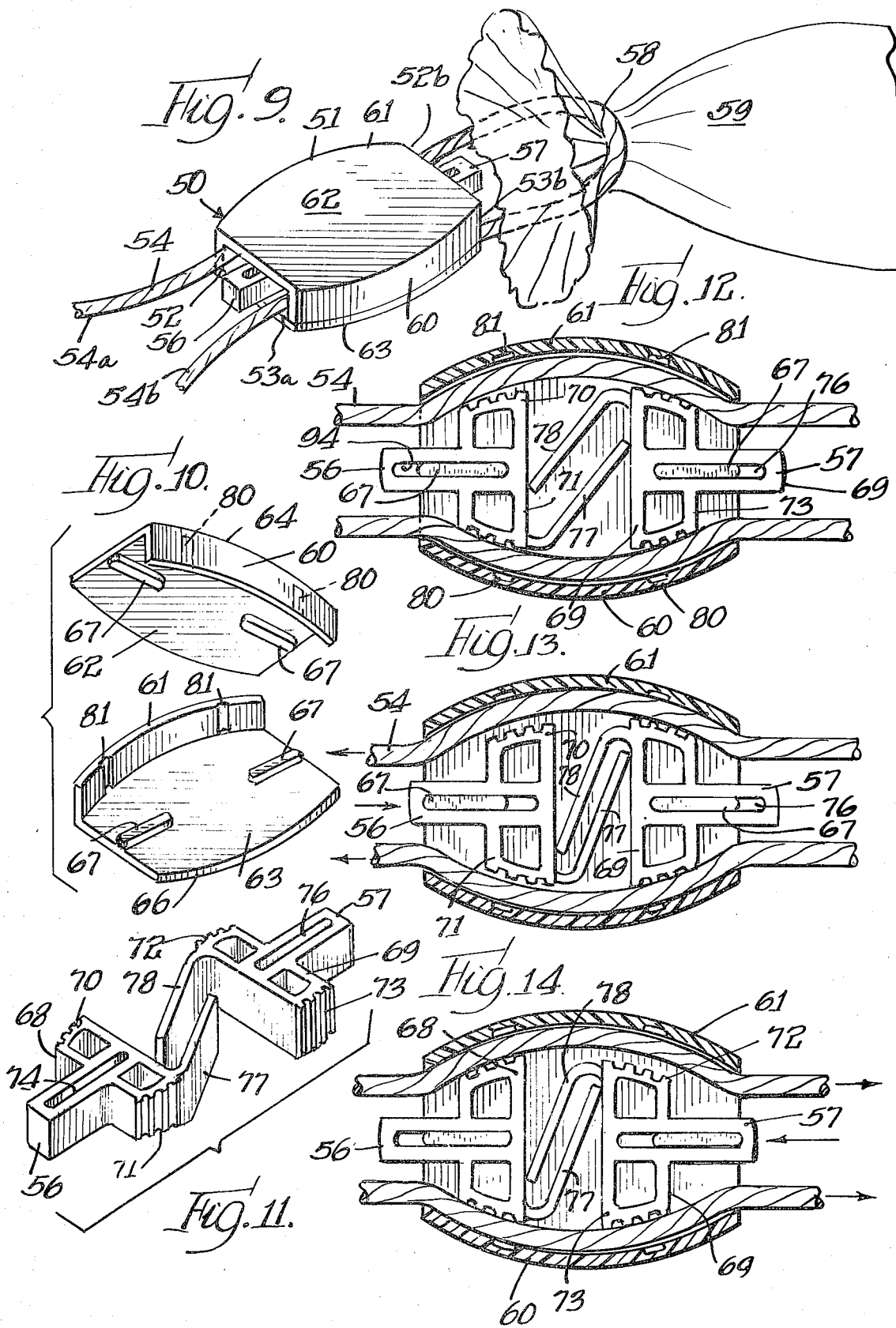

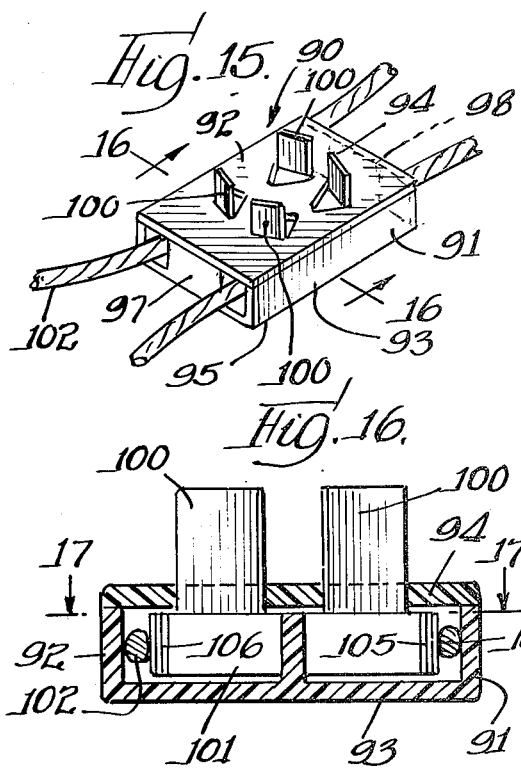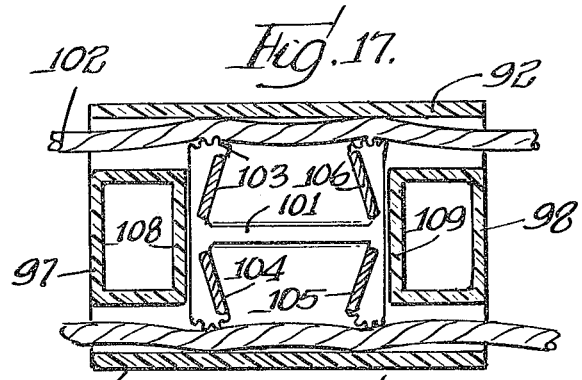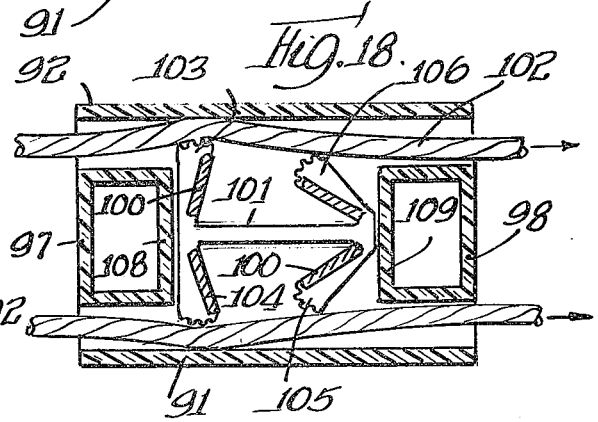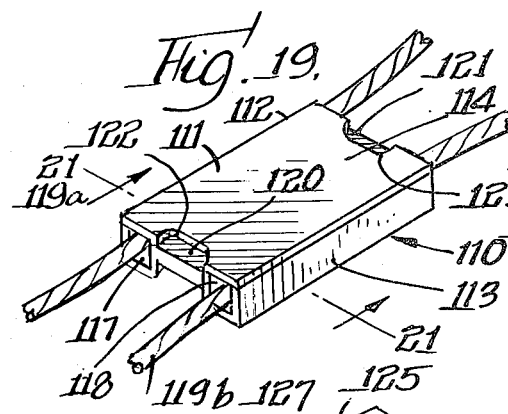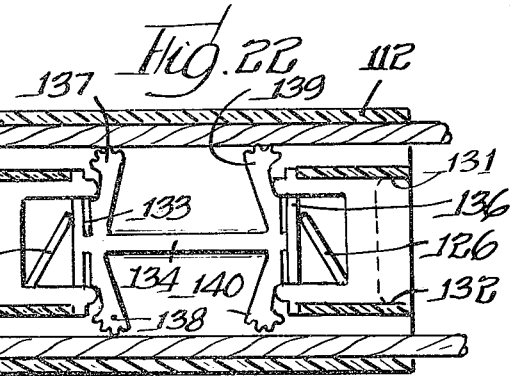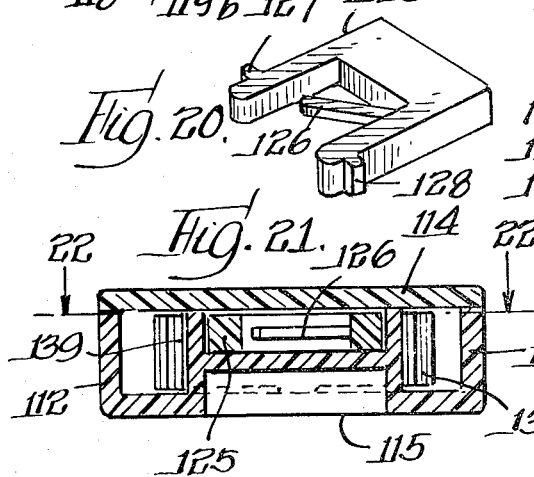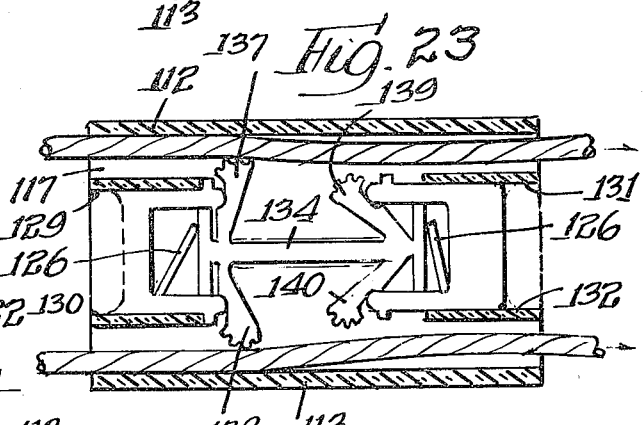

ROPE LOCK DEVICE

BACKGROUND OF THE INVENTION

The embodiment of the invention disclosed herein is directed generally to rope lock assembly devices, and more particularly to rope lock assembly devices which can be used for small size ropes or strings. Specifically, the invention is directed to a rope lock device which is formed of molded plastic components.

DESCRIPTION OF THE PRIOR ART

Heretofore, rope lock devices have been provided wherein a bight portion of a line passes through spaced apart apertures and wherein there is provided a progressively decreasing rope gripping portion having a ratchet or cam wheel arranged for gripping the rope as the rope is pulled in one direction. These prior art devices only lock the rope against movement in one direction and forces applied to the rope in the opposite direction will cause release of the rope. Furthermore, such prior art rope lock devices generally have been relatively expensive and complicated to manufacture.

SUMMARY OF THE INVENTION

Accordingly, it is an object of this invention to provide a new and improved rope lock device which can lock the rope against movement in either direction.

Another object of this invention is to provide a rope lock device which includes lock release means manually manipulated exteriorly thereof to release the rope for movement in either direction.

Still another object of this invention is to provide a new and improved rope lock device which is simple and inexpensive to manufacture while providing a high degree of reliability and efficiency in use.

Briefly, the rope lock device of this invention is primarily for use with relatively small diameter string, cord or rope which must be adjusted in position in applications where double or single lengths are to be used. For example, areas of use of the rope lock device may include laundry bags, clothing hoods, life jackets, boat lines, tent lines, tie-down lines, etc. The double lock action of the device enables tension to be applied to the line in both directions without fear of inadvertent loosening. The rope lock device is constructed of relatively inexpensive molded plastic components and is of simple design.

The rope lock device utilizes opposing pairs of movable arms cooperate with the interior walls of a case to engage the string or rope and lock it in place. Manually operated release means is provided to allow quick and easy adjustment of the lengths of rope being used.

In one configuration of the invention disclosed herein, there is provided a one-piece case which has four flexible or pivotal arms mounted therein for movement toward the interior wall for locking the rope, and includes a movable lock release having a thumb-engageable portion projecting through a slot in the cover of the case with four depending posts mounted in the case and engaging the pivotal arms for moving the same out of engagement with the rope. In another embodiment of the invention, there is provided a pair of pivotal lock releases which are capable of being operated through cut-outs formed in opposing ends of the case body. This is operated by merely squeezing the ends together and pulling on the rope in either direction.

In another embodiment of the invention, the release mechanism has manipulative members integrally formed with the locking arms and these manipulating members extend through the top of the casing so they can be engaged by a squeezing action to release the locking arms from engagement with the rope. In yet another embodiment of the invention disclosed herein, the locking arms are axially operated relative to a cammed or curved surface so that the spacing between the locking arms and the interior wall of the curved surface decreases as the locking arms move toward the ends of the casing. The lower portion of the casing is provided with an upstanding rectangular post member over which a slot within the locking arm and release member slides while the locking members move in either direction.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a diagrammatic perspective view illustrating the use of a rope lock device which is constructed in accordance with the principles of this invention;

FIG. 2 is a plan view of one form of construction of the case or body member of the rope lock device of this invention and illustrating the movable locking arms positioned therein;

FIG. 3 illustrates a perspective bottom view of a lock release member which is insertable into the construction of FIGS. 1 and 2;

FIG. 4 is an end view of the lock release mechanism of FIG. 1 shown with the top in an open position;

FIG. 5 is a sectional view taken along line 5—5 of FIG. 1;

FIG. 6 illustrates the locking mechanism of FIG. 1 in a locked condition thereby restraining movement of the rope in either direction;

FIG. 7 illustrates the lock mechanism in a released position so that rope can be pulled therethrough in one direction;

FIG. 8 illustrates the lock mechanism in a released position so that rope can be pulled through the device in the other direction;

FIG. 9 illustrates another embodiment of the rope lock device of this invention, and is illustrated closing off a bag such as a laundry bag or the like;

FIG. 10 is an exploded perspective view illustrating two halves of the case or body portion of one form of rope lock device of FIG. 9;

FIG. 11 illustrates the locking arms and release mechanisms as being formed as integral units as well as including resilient biasing means extending toward one another;

FIG. 12 illustrates the rope lock device of FIG. 9 in a condition whereby rope is restrained from movement in either direction;

FIG. 13 illustrates releasing the lock mechanisms so that rope can be pulled through the rope lock device in one direction;

FIG. 14 illustrates releasing the rope locking device so that rope can be pulled through the rope lock device in the other direction;

FIG. 15 illustrates still another alternate embodiment of a rope lock device constructed in accordance with the principles of this invention;

FIG. 16 is a sectional view taken along line 16—16 of FIG. 15;

FIG. 17 is a top sectional view taken along line 17—17 of FIG. 16, and illustrating an H-shaped lock mechanism with integrally formed release tabs extending upwardly therefrom to be manually compressed to release the rope for movement in either direction;

FIG. 18 illustrates the rope lock device of FIG. 15 with the rope locking member disengaging the rope for movement thereof in one direction;

FIG. 19 is yet another alternate configuration of the rope lock device constructed in accordance with the principles of this invention;

FIG. 20 illustrates the release mechanism utilized in the rope lock device of FIG. 19;

FIG. 21 is an end sectional view taken along line 21—21 of FIG. 19;

FIG. 22 is a top sectional view taken along line 22—22 of FIG. 21; and

FIG. 23 is a top sectional view similar to that of FIG. 22 but illustrating the lock mechanism in a released condition to allow movement of the rope in one direction.

DETAILED DESCRIPTION OF THE ILLUSTRATED EMBODIMENTS

Referring now to FIG. 1, there is seen a rope lock assembly constructed in accordance with the principles of this invention and is designated generally by reference numeral 10. The rope lock assembly 10 is formed of a body portion 11 having spaced apart side walls 12 and 13, a bottom wall 14 and a top wall 16. A rope 17 passes through aligned openings or apertures formed in end walls 18 and 19, and is here illustrated as having a bight portion 20 passing around a bag 21, which may be a laundry bag, or the like. The rope 17 has two portions 17a and 17b passing through the rope lock assembly 10 and both portions are restrained from moving in either direction by the movable arm means located within the body 11. To effect release of the rope 17 a release lever 22 extends through a slot 23 of the top wall 16 and is urged in either direction from a central neutral position to release the rope for movement in the same direction as the lever 22 is moved.

For a better understanding of the details of construction of the rope lock assembly 10, reference is now made to FIGS. 2, 3, 4 and 5. FIG. 2 illustrates the body portion 11 as providing a cavity between the spaced apart side walls 12 and 13 and the bottom and top walls 14 and 16, respectively. The end walls 18 and 19 are provided with aligned apertures 26 and 27 located adjacent one side wall and a second pair of aligned apertures 28 and 29 located adjacent the other side wall. A lock release plate 30 is slidably inserted into the top wall 16 and carried therein in a recess or channel 31 so that a plurality of depending abutments 32, as best seen in FIG. 3, will engage correspondingly spaced apart recesses 33 formed in an H-shaped movable arm means 34. The depending abutments are utilized to resiliently urge the plurality of free end members 36, 37, 38 and 39 out of engagement with a rope passing therethrough. To maintain the H-shaped movable arm means 34 in a substantially centralized position within the body 11, end confinement portions 40 and 41 are provided.

In the illustrated embodiment the rope lock assembly is preferably constructed of molded plastic components which are ultimately snapped together to form an operating device. For example, FIG. 4 illustrates the body portion 11 as being of molded plastic having the top wall 16 thereof in a folded open condition to receive the slide element 30 and the H-shaped movable arm member 34. After these components are inserted into the body the top wall member 16 is folded along the top longitudinal edge portion of the side wall 12 so that a plurality of alignment posts 43 are positioned within the interior of the body immediately adjacent the side wall portions thereof. These alignment posts serve to maintain the top wall portion 16 in alignment with the immediately adjacent surrounding side walls, and also provide means for adding substantial rigidity to the structure after it is assembled.

To maintain the rope lock assembly in an assembled condition, a hook member 44 is formed along the edge of the top wall 16 to engage with a correspondingly fashioned latch element 46 located at the top of the side wall 13. To facilitate folding over of the top wall 16, a groove 47 is formed along the mating edge between the side wall 12 and top wall 16 thereby eliminating the effects of bulging or bunching up of excess material during the folding operation. As best seen in FIG. 5, the depending abutments 32 of the slide member 30 are nested within the recesses 33 after the top member 16 is folded over and locked in place.

Referring to FIGS. 6, 7 and 8, the method of operation of the rope lock assembly is more clearly illustrated. In FIG. 6 the rope portions 17a and 17b pass through the spaced apart aligned pairs of openings 26, 27 and 28, 29, respectively, and have a portion thereof grippingly urged against the interior side walls of the wall portions 12 and 13 by the free end portions 36, 37, 38 and 39 of the H-shaped movable arm means 34. Forces applied to the rope in either direction will cause certain ones of the free end portions to be pulled tightly against the side wall portion and compress the rope into a locked condition therebetween.

FIG. 7 illustrates release of the rope for movement to the left, as seen in the drawing. This is accomplished by urging the stem 22 to the right to cause the depending abutments 32 to bend the free end portions 36 and 37 away from engagement with the rope portions 17a and 17b. The rope can then be urged or moved to the left as the free arm portions 28 and 29 will automatically be folded or moved easily in the direction of movement of the rope. When the rope is to be moved in the opposite direction, the stem 22 is moved to the left, as seen in FIG. 8, so that the depending abutments 32 bend the free ends 28 and 29 of the H-shaped movable arm member 34 so that they disengage the rope. The rope is then easily pulled to the right as the free ends 36 and 37 do not offer any restraining action in this direction. The structure illustrated in FIGS. 1–8 therefore provides a simple and efficient means for restraining the movement of a rope through a rope lock device in both directions and wherein the release is easily obtained by moving a manually operated release device so that the rope can be urged in either of directions as desired.

Referring now to FIGS. 9, 10, 11, 12, 13 and 14 there is seen an alternate embodiment of the rope lock assembly of this invention. Here the rope lock assembly is designated generally by reference numeral 50 and includes a body portion 51 having openings 52a and 53a formed at one thereof with corresponding openings 52b and 53b formed at the other end thereof. Here the openings are illustrated as being substantially rectangular in configuration, it being understood that oval or circular openings may be provided. A rope 54 has portions 54a and 54b passing through the openings 52 and 53, respectively, and is firmly held in a locked position within the rope lock device 50 until such time as oppositely directed release tabs 56 and 57 are manually compressed by squeezing. In FIG. 9, the illustrated embodiment shows the bight portion 58 of the rope 54 wrapped about a bag 59 which may be a laundry bag, or the like.

The body 51 preferably is formed of arcuately shaped wall segments 60 and 61 with spaced apart top and bottom walls 62 and 63 being formed on similarly shaped half portions 64 and 66. The top and bottom walls are so labeled for purposes of clarity, but it will be understood that their function is arbitrary and they may be reversed. FIG. 10 illustrates the configuration of the similarly shaped halves 64 and 66. However, it will be understood that the halves 64 and 66 need not be similar.

Referring now to FIG. 11, there is seen movable arm means 68 and 69 which are to be inserted into the body 51 when the halves 64 and 66 are in an assembled condition. The movable arm means 68 and 69 are T-shaped in configuration having oppositely directed free ends which are to be urged against the arcuately shaped walls 60 and 61 when a rope is to be locked in position. The T-shaped movable arm member 68 has oppositely directed free ends 70 and 71 which have serrations or rope gripping formations formed to extend transversely thereof to insure a more positive gripping action with the rope. The movable arm means 69 has oppositely directed free end portions 72 and 73 with rope gripping portions formed thereat to grip the rope and restrain it from movement in the opposite direction. Each of the T-shaped movable arm means 68 and 69 is provided with an elongate slot 74 and 76, respectively, which are to engage guide members 67 formed on the interior portion of the top and bottom walls 62 and 63.

In the illustrated embodiment, resilient tabs 77 and 78 are formed as an integral part of the T-shaped movable arm means and are angled in such a manner as to provide resilient spring means to urge the movable arms away from one another. Applying pressure to the release tabs 56 and 57 will squeeze the resilient tabs 77 and 78 to release the free ends from engagement with the rope.

FIG. 12 illustrates the free ends 70, 71, 72 and 73 in firm engagement with the rope 54 for locking the rope against movement in either direction. To further insure that the movable arm means are maintained in an urged condition against the rope, the resilient tabs 77 and 78 are of a dimension so as to be in contact with the rear surface of the other movable arm means, as best seen in FIGS. 12, 13 and 14. When the rope 54 is to be released and moved to the left, as seen in FIG. 13, the release tab 56 is urged inwardly to disengage the free end portions 70 and 71 from the rope. The rope will move to the left as the movable arm member 69 will automatically disengage from the rope as the rope is pulled therethrough. When the rope is to be pulled to the right, as seen in FIG. 14, the tab release 57 is urged to the left and the free ends 72 and 73 of the movable arm member 69 disengages the rope. Notches 80 and 81 are formed in the arcuately shaped side wall portions 60 and 61, respectively, to provide additional gripping edges at the interior of the side wall so that when the rope is urged thereagainst a more firm holding action is achieved.

Referring now to FIGS. 15, 16, 17 and 18 there is seen still another alternate form of rope lock device constructed in accordance with the principles of this invention and designated generally by reference numeral 90. Here the rope lock device 90 is formed of a housing 91 having side wall portions 92 and 93, top and bottom wall portions 94 and 96 and end walls 97 and 98. Extending through the top wall portion 94 are a plurality of release tabs 100 which are formed integrally with an H-shaped movable arm member 101, as best seen in FIGS. 17 and 18. A rope 102 is locked in place by the free end portions 103, 104, 105 and 106. The rope can then be pulled in the desired direction. The H-shaped movable arm member 101 is confined within the body 90 by spaced apart inner wall members 108 and 109.

FIGS. 19, 20, 21, 22 and 23 illustrate still another alternate embodiment of the rope lock assembly of this invention. Here the rope lock assembly is designated generally by reference numeral 110. The rope lock assembly 110 includes a body portion 111 having side walls 112 and 113 and top and bottom walls 114 and 115 respectively. Openings 117 and 118 are formed at one end of the body 111 and receive lengths of rope 119a and 119b. In this instance, rope release means 120 and 121 are formed at the ends and are recessed by cut-out portions 122 and 123, respectively. A release element 125, FIG. 20, is C-shaped in configuration and has a resilient tab 126 formed at the inner portion of the C. Stop tabs 127 and 128 are formed on the spaced apart arms and are dimensioned to engage interior walls 129 and 130 on one side of the housing or body portion 111 and to engage interior walls 131 and 132 on the opposite side of the body 111. A bar portion 133 is formed on one side of an H-shaped movable arm member 134 and a second bar portion 136 formed on the other side thereof. These bar portions engage with the C-shaped release member 125 to remove free ends 137, 138, 139 and 140 from engagement with the rope at the interior of the body. This is best illustrated in FIG. 23 which shows the right hand release member 125 urging the free ends 139 and 140 out of engagement with the rope. The C-shaped release member is urged back to its neutral position both by the resilient action of the free ends of the extended arm portions of the H-shaped member 134 and by the resilient tabs 126.

What has been described are several alternate embodiments of a rope lock device constructed in accordance with the principles of this invention wherein the rope is restrained from movement in either direction until manually selectively released by sliding or compressing release tabs extending from the body portion thereof. While several specific embodiments have been illustrated herein, it will be understood that still further variations and modifications may be effected without departing from the spirit and scope of the novel concepts disclosed and claimed herein.

The invention is claimed as follows:

1. A rope lock device comprising: a body having spaced apart top and bottom wall-forming portions and diametrically opposed side wall-forming portions, a first pair of spaced apart apertures formed at one end of said body and a second pair of spaced apart apertures formed at the other end of said body with apertures closest to said side wall-forming portions adapted to receive a length of rope therethrough, a pair of movable arm means positioned within said body and including gripping means to engage the rope and urge the rope firmly against one of said side wall-forming portions at each end of said body and restraining the rope against movement in either direction, and selective release means having a first portion within said body and engageable selectively with said movable arm means, and a second portion extending outwardly of said body to be manually operated to effect selective release of said movable arm means from the rope, whereby the rope can be pulled through said rope lock assembly in either direction.

2. A rope lock assembly comprising: a body having spaced apart top and bottom wall-forming portions and diametrically opposed side wall-forming portions, a first pair of spaced apart apertures formed at one end of said body and a second pair of spaced apart apertures formed at the other end of said body with apertures closest to said side wall-forming portions adapted to receive a length of rope therethrough, movable arm means positioned within said body and including gripping means to engage the rope and urge the rope firmly against one side of said side wall-forming portions and restraining the rope against movement in either direction, release means having a first portion within said body and engageable with said movable arm means, and a second portion extending outwardly of said body to be manually operated to effect release of said movable arm means from the rope, whereby the rope can be pulled through said rope lock assembly in either direction, said bottom and said side wall-forming portions being U-shaped in the cross section, said top wall-forming portion being hinged at one edge with the top edge of one of said side wall-forming portions and having a free edge disposed therefrom, said movable arm means being insertable into said body when said top wall-forming portion is open, latch means formed along the top edge of the other of said side wall-forming portions, and hook means formed along said free edge of said top wall-forming portion and cooperable with said latch means to hold said top wall-forming portion closed when the rope lock device is in an assembled condition.

3. The rope lock assembly as set forth in claim 2 wherein said movable arm means is a single H-shaped unit having the four free end portions thereof extending toward said side wall-forming portions and including teeth gripping means formed at said free ends for gripping the rope passing therethrough.

4. The rope lock assembly as set forth in claim 2 wherein said movable arm means is formed of a first perpendicular member extending across said body and engageable with said side wall-forming portions thereof, said first perpendicular member further including a transversely disposed resilient member extending therefrom on a side opposite the end of said rope lock assembly and insertable between a transversely disposed resilient member and a second similarly shaped member to provide bias means for urging said first and second perpendicular members into engagement with rope passing therethrough.

5. The rope lock assembly as set forth in claim 4 wherein said side wall portions are arcuately-shaped from end to end and said movable arm means is urged into engagement with said side wall portions when moved toward the ends of said rope lock assembly.

6. The rope lock assembly as set forth in claim 4 wherein said release means is secured to said perpendicular member and extending from the ends of said body portion intermediate the apertures formed therein, said release means including a slot formed longitudinally therealong to engage an upstanding guide member formed in said bottom and top wall-forming portions.

7. The rope lock assembly as set forth in claim 1 wherein said body is formed of two similarly shaped halves which are provided with snap lock means along their mating edge portions to be fastened together upon insertion of said movable arm means and said release means therein.

8. The rope lock assembly as set forth in claim 1 wherein said top wall-forming portion has a slot formed therein, said release means including a stem extending through said slot and including depending abutments extending into said body, said movable arm means being formed in an H-shaped configuration having recesses formed near the free ends thereof to receive said depending abutments for disengaging said free ends from a rope passing through said rope assembly when said abutments are moved as a result of actuation of said stem.

9. The rope lock assembly as set forth in claim 1 wherein said bottom and said side wall-forming portions are U-shaped in the cross section, said top wall-forming portion being hinged along the top edge of one of said side wall-forming portions, said movable arm being inserted into said housing when the top wall-forming portion is open, said top wall-forming portion having an alignment post located near the four corners thereof to be inserted into said U-shaped configuration for maintaining alignment between said side wall-forming portions and said top wall-forming portion.

10. The rope lock assembly as set forth in claim 1 wherein said side wall-forming portions are arcuate in shape being more closely spaced together near said ends, said movable arm means being formed of first and second back-to-back transversely disposed members having oppositely directed rope gripping portions extending toward said arcuate walls to form a progressively decreasing gripping zone between said arcuately shaped wall and said rope gripping portions.

11. The rope lock assembly as set forth in claim 10 further including integral biasing means formed on said first and second back-to-back rope gripping members and engageable with the other of said rope gripping members to urge them apart and toward the diverging ends of said arcuate walls.

12. The rope lock assembly as set forth in claim 10 further including a release stem extending from said first and second back-to-back rope gripping members and protruding through said ends to be compressed for release of said rope gripping portions from a rope passing therethrough.

13. The rope lock assembly as set forth in claim 1 wherein there is provided a plurality of openings formed in said top wall-forming member, a plurality of tab members secured to said movable arm means and extending through said openings to be manually compressed toward a central point therebetween for release of said movable arm members from a rope passing therebetween.

14. The rope lock assembly as set forth in claim 1 wherein said movable arm means is H-shaped in configuration with a bar portion extending parallel to each of said sides of the H-shaped configuration and providing means for engaging resilient tab means formed on said release means.

15. A rope lock assembly comprising: a molded plastic body member having spaced apart top and bottom wall-forming portions and diametrically opposed side wall-forming portions, a first pair of spaced apart apertures formed at one end of said body and a second pair of spaced apertures formed at the other end of said body with the apertures closest to the side wall-forming portions adapted to receive a length of rope therethrough, pairs of molded plastic movable arm means positioned within said body at each end of said plastic body member and including gripping means to engage with the rope and urge the rope firmly against the side wall-forming portions at each end of said body member and restraining the rope against movement in either direction, and a molded plastic release member having a first portion within said body selectively engageable with each pair of the movable arm means and a second portion extending outwardly of the body to be manually operated to effect release of the movable arm means, whereby selective actuation of said release member will allow the rope to be pulled through the rope lock assembly in either direction.

16. The rope lock assembly set forth in claim 15 wherein said molded plastic body portion has the bottom and side wall-forming portions thereof U-shaped in the cross section and the top wall-forming portion hinged at one edge with a top edge of one of the side wall-forming portions, said hinge being formed of a reduced thickness of molded plastic material of which said side wall and said top wall-forming portions are formed, said movable means being insertable into said body when said top wall-forming portion is open, and molded latch means formed along the top edge of the other of said side wall-forming portions to engage with molded hook means formed along a free edge of said top wall-forming portion and cooperable with said latch means to hold said top wall-forming portion closed when said rope lock device is in an assembled condition.

17. The rope lock assembly as set forth in claim 15 wherein said molded plastic body portion is formed of two similarly configurated halves, each half forming one of said side wall-forming portions and one of said top and bottom wall-forming portions, each half including guide means formed therein to be diametrically opposed when the halves are placed in an assembled condition, said rope lock assembly including first and second perpendicular members forming said movable arm means and including transversely disposed resilient means extending therefrom on a side opposite the end of said rope lock assembly and insertable between a second transversely disposed resilient member of the second perpendicular member to provide bias means for urging said first and second perpendicular members against the rope passing therethrough.

18. The rope lock assembly as set forth in claim 15 wherein said molded plastic movable arm means includes tab means extending upwardly through openings formed in the top wall-forming portion of said body and provide means for disengaging said movable arm means from the rope passing therethrough to release the rope for movement in either direction.

19. The rope lock assembly as set forth in claim 15 wherein said release means is formed of a C-shaped member having outwardly directed tab portions engaging the interior wall-forming portions of said body for stopping movement thereof in an outward direction and further including a resilient tab formed within the bight portion thereof to engage a transversely disposed substantially rigid bar portion of said movable arm means.

* * * * *